United States Patent
Hellstrand

(10) Patent No.: US 7,110,035 B1
(45) Date of Patent: Sep. 19, 2006

(54) DEVICE AND A METHOD FOR AN INFRARED IMAGE ANALYZING AUTOFOCUS

(75) Inventor: Magnus Hellstrand, Stockholm (SE)

(73) Assignee: Flir Systems AB, Danderyd (SE)

( * ) Notice: Subject to any disclaimer, the term of this patent is extended or adjusted under 35 U.S.C. 154(b) by 0 days.

(21) Appl. No.: 09/576,266

(22) Filed: May 24, 2000

(30) Foreign Application Priority Data

May 25, 1999 (SE) .................................. 9901881

(51) Int. Cl.
*H04N 5/232* (2006.01)
(52) U.S. Cl. ............... 348/350; 348/164; 348/345; 348/347; 348/348; 250/201.2; 250/203.2
(58) Field of Classification Search ........ 348/345–356, 348/244, 164, 121–124; 250/201.2, 203.2
See application file for complete search history.

(56) References Cited

U.S. PATENT DOCUMENTS

| | | | | |
|---|---|---|---|---|
| 3,932,733 A * | 1/1976 | Olsen et al. | ................. | 318/640 |
| 5,589,876 A * | 12/1996 | Konuma | ...................... | 348/164 |
| 5,621,457 A * | 4/1997 | Ishiwaka et al. | .............. | 348/78 |
| 5,739,858 A * | 4/1998 | Suda et al. | .................. | 348/355 |
| 5,752,115 A * | 5/1998 | McIntyre et al. | ........... | 396/431 |
| 5,790,710 A * | 8/1998 | Price et al. | ................. | 382/255 |
| 5,861,915 A * | 1/1999 | Sato et al. | ............... | 348/208.2 |
| 5,874,994 A * | 2/1999 | Xie et al. | ................... | 348/349 |
| 6,072,525 A * | 6/2000 | Kaneda | .................. | 348/208.15 |
| 6,088,060 A * | 7/2000 | Suda et al. | .................. | 348/350 |
| 6,239,433 B1 * | 5/2001 | Porter | ..................... | 250/338.3 |
| 6,246,437 B1 * | 6/2001 | Kaneda | .................. | 348/333.03 |
| 6,268,883 B1 * | 7/2001 | Zehnder et al. | ............. | 348/164 |
| 6,281,970 B1 * | 8/2001 | Williams et al. | ......... | 356/141.4 |
| 6,341,180 B1 * | 1/2002 | Pettersson et al. | .......... | 382/255 |
| 6,507,366 B1 * | 1/2003 | Lee | ............................ | 348/352 |
| 6,556,246 B1 * | 4/2003 | Suda | ......................... | 348/352 |

FOREIGN PATENT DOCUMENTS

| | | |
|---|---|---|
| EP | 0 197 598 | 10/1986 |
| EP | 0 425 882 | 5/1991 |
| WO | WO 98/50196 | 11/1998 |

OTHER PUBLICATIONS

F.R. Boddeke et al., "Autofocusing in Microscopy Based On The OTF And Sampling", Nov. 22, 1994, *IOP Publishing Ltd.*, Bioimaging 2, 193-203.

* cited by examiner

*Primary Examiner*—Tuan Ho
*Assistant Examiner*—Chriss S. Yoder
(74) *Attorney, Agent, or Firm*—Young & Thompson

(57) ABSTRACT

An apparatus and a method is introduced by which infrared image analysing automatic focusing is made possible. The invention among others comprises a focus function to be used by a search operation in order to control a moving means (50) adjusting a focusing optical convergence arrangement (20). Usage of the invention enables a fast and efficient way of obtaining a focused image although the infrared optical system is a difficult system and a not particularly rewarding technique in the past.

11 Claims, 14 Drawing Sheets

DEVICE AND A METHOD FOR AN INFRARED IMAGE ANALYZING AUTOFOCUS

TECHNICAL FIELD OF THE INVENTION

The present invention generally relates to the field of infrared optical systems and especially to the apparatus and methods required for automatic focusing on viewed objects.

BACKGROUND OF THE INVENTION

When infrared optical systems are taken into consideration, a number of physical properties in connection with this kind of infrared technology must be regarded. The limited amount of light energy transmitted through the objective constitutes additional difficulties to infrared autofocuses in comparison with visible light autofocuses. In infrared optical systems like the above mentioned, the limiting device is the detecting unit and its performance and efficiency characteristics. This is one of the reasons explaining that the attempts at constructing automatic infrared image analysing focuses have not succeeded in the past.

An article of Frank R. Boddeke et al. in the publication Bioimaging, 2, 193–203, (1994) discloses an algorithm for autofocusing including usage of a focus function, which algorithm constitutes a basis for image analysing autofocuses. Single and multiple use of simple filters are described as well as noise reducing methods in practice.

Due to the above mentioned additional difficulties associated with infrared autofocusing apparatus, the complexity of prior known systems has increased to an unacceptable level when attempts have been made at managing the low energy level of infrared light. The major problem related to such infrared systems is the low f-number. Infrared systems require a low f-number and as a consequence of this number. Infrared systems require a low f-number and as a consequence of this requirement, the signal-noise-ratio is low and hence a large number of acquired images must be analysed in order to obtain sufficient resolution of the viewed object. Processing capacity in such objectives is limited due to the additional costs associated with higher processing capacity and the cost will finally fall on the end consumer. Until today, no successful solutions of this problem have been made.

Earlier a focus window has been chosen as a central field of the image detecting area. This central field is in practice situated perpendicularly to the optical axis. Thus, this used to be the traditional method of proceeding and it is still used by most of the prior known active autofocusing systems. However, only a minimal fraction of the actual area of the detected image is utilised by this method and desirable would be to use a larger or at least the most suitable area of the detected image as focus window.

OBJECT OF THE INVENTION

An object of the invention is to provide an automatic focusing device for an infrared optical apparatus and a method enabling automatic focusing on viewed objects.

Another object of the invention is to provide an automatic focusing device for an infrared optical apparatus taking the heating of the elements of the optical system into consideration.

Yet another object of the invention is to provide an infrared optical apparatus having the image continuously well focused during monitoring an arbitrary process.

Other objects of the invention are to provide methods to analyse the most rewarding area of the detected image, to introduce a powerful and efficient search operation for use in automatic focusing systems and to disclose a useful operative focus function in automatic focusing devices.

SUMMARY OF THE INVENTION

A solution of the above mentioned problems is hereby introduced according to the present invention. The invention is an image analysing focusing device for an infrared optical apparatus. It comprises controllable optical convergence means, preferably a lens arrangement, image detection means onto which the optical convergence means is projecting an image of an object, processing means for processing signals from the image detecting means to provide control signals to control the optical convergence means to focus the image of the object onto the image detecting means.

The invention is characterised by search operation means in the processing means analysing the image of the image detecting means to find at least one image window, which is part of the image, for which a focusing is to be done in accordance with predetermined conditions. A focusing function means, preferably in the processing means, provides a focusing on the at least one image window, based on providing as distinct differences between individual detecting positions (pixels) within the image window as possible, using an iterative process.

By means of the invention is it possible to choose an area of the image detection means other than a central area to focus on. Such an area subjected to analysis would enable a selection of the most interesting and informative parts of the image to be accomplished. A deliberate choice in this described way, could make a procedure of focusing possible on the most rewarding area of the detected image area and thus enhance the focusing performance of the apparatus and improve the quality of the focused image.

BRIEF DESCRIPTION OF THE DRAWINGS

The present invention will now be discussed in more detail with reference to preferred embodiments of the present invention, given only by way of example, and illustrated in the accompanying drawings, in which:

FIG. 10 shows a schematic block diagram describing the estimation of a distance to an object, which is focused on.

DETAILED DESCRIPTION AND OPERATION OF THE EMBODIMENTS

Figure 1:
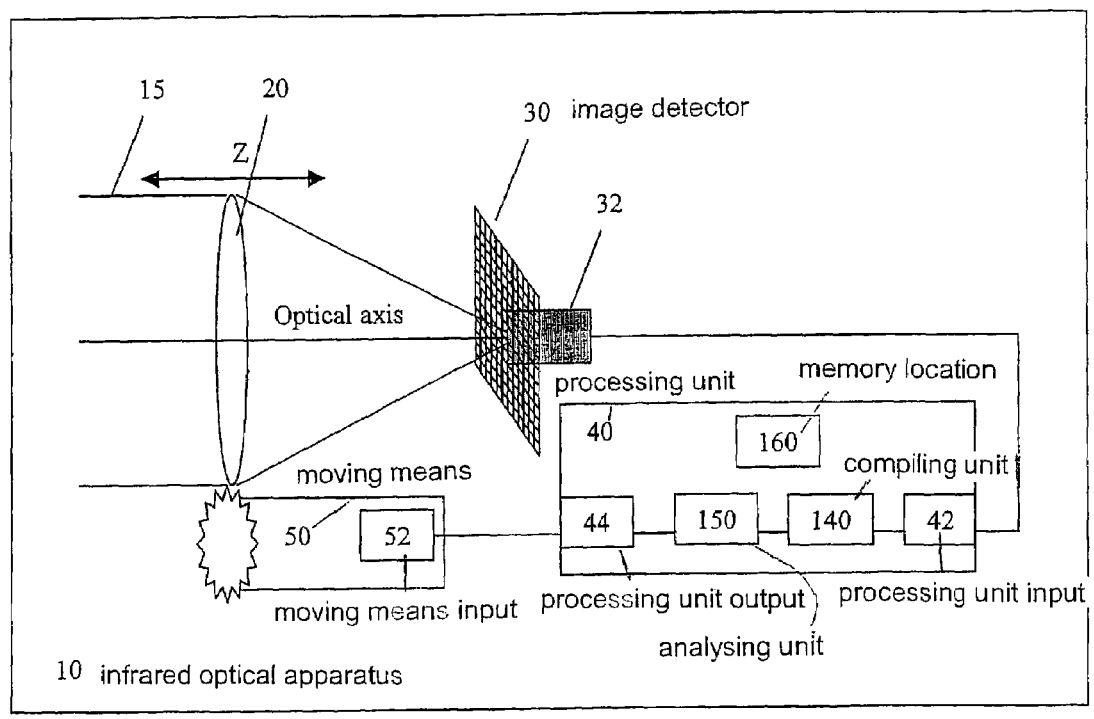
FIG. 1 depicts an infrared optical device with an automatic focusing according to the present invention.

With reference to FIG. 1 an infrared optical apparatus 10 comprises a number of constituents. The optics is represented by a focusing optical convergence arrangement 20, which is movable as an integral unit or comprises at least one movable optical part. The optical convergence arrangement comprises preferably a lens or a lens system. However, it is also possible to have reflecting components instead of lenses, such as a Cassegrain or Schmidt arrangement. The focusing optical convergence arrangement 20 as a whole or its movable part or parts is movable along the optical axis (z-direction in FIG. 1) and viewed objects are projected on an image detecting and creating means 30 by means of the optical convergence arrangement 20. The image detection means 30 could preferably be a focal plane array, FPA, as depicted in FIG. 1, but other kinds of image detection arrangements are also possible. Thus, even though a detector array 30 is illustrated as the image creation means in this embodiment, it is possible to use for example a scanning detector arrangement instead of a staring detector arrangement as described.

Image signals are created through detector elements in the detector array 30, which image signals are delivered from a detector output 32 to an input 42 of a processing unit 40, preferably a central processing unit CPU, a microcomputer or programmable hardware. This unit 40 comprises two essential units, a compiling unit 140, which is responsible for controlling the system to make the search operation by means of a search operation, and an analysing unit 150, which responsibility is image analysis by iterative numerical and/or similar methods and a focus measure function, FMF. After the particular area on which focusing is to be made is found, by utilisation of the features further described below, the search is divided into at least two subsequent steps, a coarse but fast focusing step using the FMF based on low spatial frequencies in the image, followed by a succeeding slower but more accurate precision step by using an FMF based on high spatial frequencies in the image. It is to be noted that this search is intended to be made automatically. A convenient way of making this is to make the coarse focusing step using so-called "hill-climbing", which means that the iteration is to be continued in the same direction of iteration as long as the FMF is increasing. Subsequently, "curve-fitting" methods are used for the precision focus step, which means adaptation of a mathematical function, such as a second degree polynomial, a Gaussian function or the like, and calculate the maximum of the equation and based upon this information derive the corresponding focus position of the movable part or parts of the optical system.

A further elucidation and description of the operation of the units 140 and 150 in more detail will follow in coming sections. Thus, the signal processing and image analysis of the system is carried out within the processing unit 40, and so is the control of the system operation.

Operative commands are distributed from an output 44 of the processing unit 40 to the input 52 of a moving means 50 for the optical convergence arrangement as a whole or its movable part or parts, preferably an electric motor allowing sufficient resolution or another similar low electric power consuming device. The moving means 50 is connected to the focusing optical convergence arrangement 20 and controls the arrangement 20 in accordance with its received operative commands from the processing unit 40. These operative commands are in turn controlled by the above search operation of a compiling unit 140, which constitutes an operative basis for the processing unit 40 to control the apparatus 10.

Choice of Focus Window

In a system of the above described kind the procedure of focusing is initialised by determination of a view area in the image in which the image is to be analysed thoroughly. This view area is denoted focus window. The choice of focus window can be made in numerous ways and it is based on different operator requirements but also on technical limitations. A number of methods will be presented in the following for choosing a focus window and a plurality of criteria concerning the image, which all could be considered for determination of a useful focus window within the image creation means 30 to perform the focus analysing procedure on. This focus window will normally correspond to an area of the image of the image creation means 30, preferably a plurality of detector elements (pixels) in a detector array.

By using the focusing feature according to the present invention it is possible to deliberately choose a certain focus window other than the most centrally situated. The choice is based on parameters related to the quality of the image and to the automatic focusing performance. Such a motivated choice of focus window is advantageous due to enhancement of the image processing and analysis, which can also be made faster. Utilisation of the focusing methods described in this application minimises the risk of ambiguous image analysis with several optical settings appearing equally focused. These methods also enable a possibility to find sufficient contrast within an image although little contrast appears in the most central part of the image creation means 30, i.e. usually the detector array.

Another useful way of choosing a part of the image, i.e. analyse at least one of the elements (pixels) in the detector array, which part for a certain industrial application may be the most valuable, is to utilise thermal differences within the image i.e. differences between detector elements in the detector array 30. If the optical infrared automatic focusing device is coupled to and combined with a radiometric sensor instrumentation, for instance 100, 110 and 120 further described below, this development may be an advantageous and important approach for an optimum choice of focus window.

A choice like the one mentioned above based on thermal properties may be utterly useful and several alternative embodiments are feasible, which all of them build on the same principle instrumentation.

It is to be noted that more than one window may be chosen and several simultaneous searches for focus windows may be run in parallel, provided the processing capacity of the optical system allows for this parallel operative mode. In such a case, more than one estimation of optimal position of the optical convergence means is calculated simultaneously. The analysing unit 150 is then furnished with predetermined estimations to be able to compare the conditions and decide which window to choose among the analysed.

Figure 2:
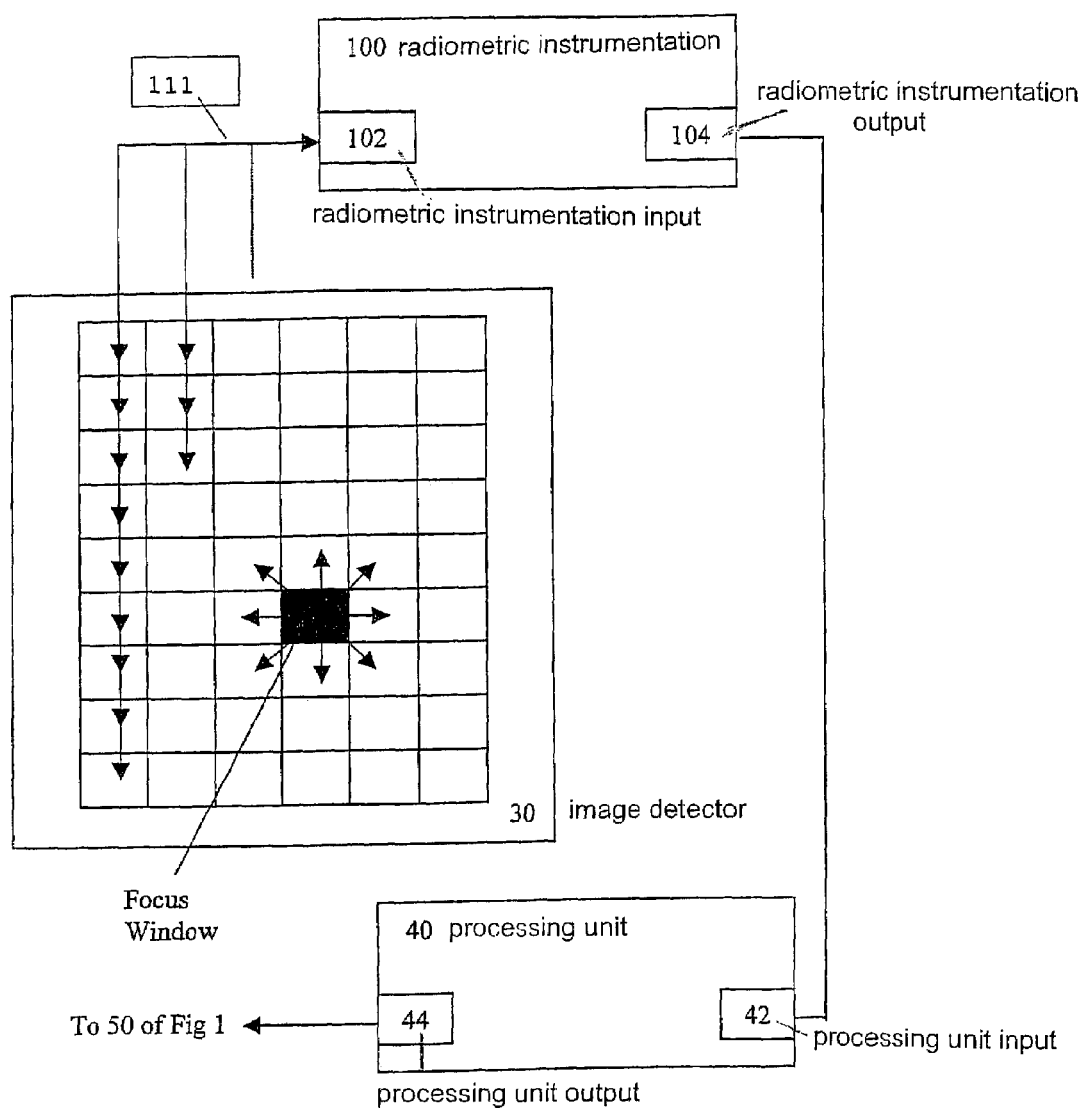
FIG. 2 shows parts of FIG. 1 in more detail in a first embodiment with a possibility to choose a suitable focus window.

In a first embodiment, shown in FIG. 2, the focusing is carried out through image analysis of one single pixel (denoted focus window in FIG. 2) within the detector array 30. The particular pixel to be image analysed and thus focused on is searched among all pixels of the detector array 30 and is chosen due to its thermal properties. The pixel is distinguished from all other pixels of the detector array because of its extreme temperature value. The pixel subjected to focusing may be either the coldest or the warmest. Such an approach requires a bi-directional radiometer connection 111 in connection with each pixel of the detector array 30 and with an input 102 of a radiometric instrumentation 100 from which output 104 image signals with radiometric data are delivered to the input 42 of the processing unit 40. Compilation, processing and analysis of received data is performed within the processing unit 40, first with a coarse process using a low pass filtering, and the result of this analysis results in that one pixel is chosen, for which a high pass filtering or band pass filtering for precision focusing is carried out. This embodiment compares temperatures of different pixels relative to each other and therefore no radiometric instrumentation for calibration is required. The iteration, as operative commands to the input 52 of the moving means 50, is then made on the basis of providing at least the best adaptation to the focus function described below, for providing as distinct differences between the chosen pixel and at least one of its neighbouring pixels as possible.

Figure 3:
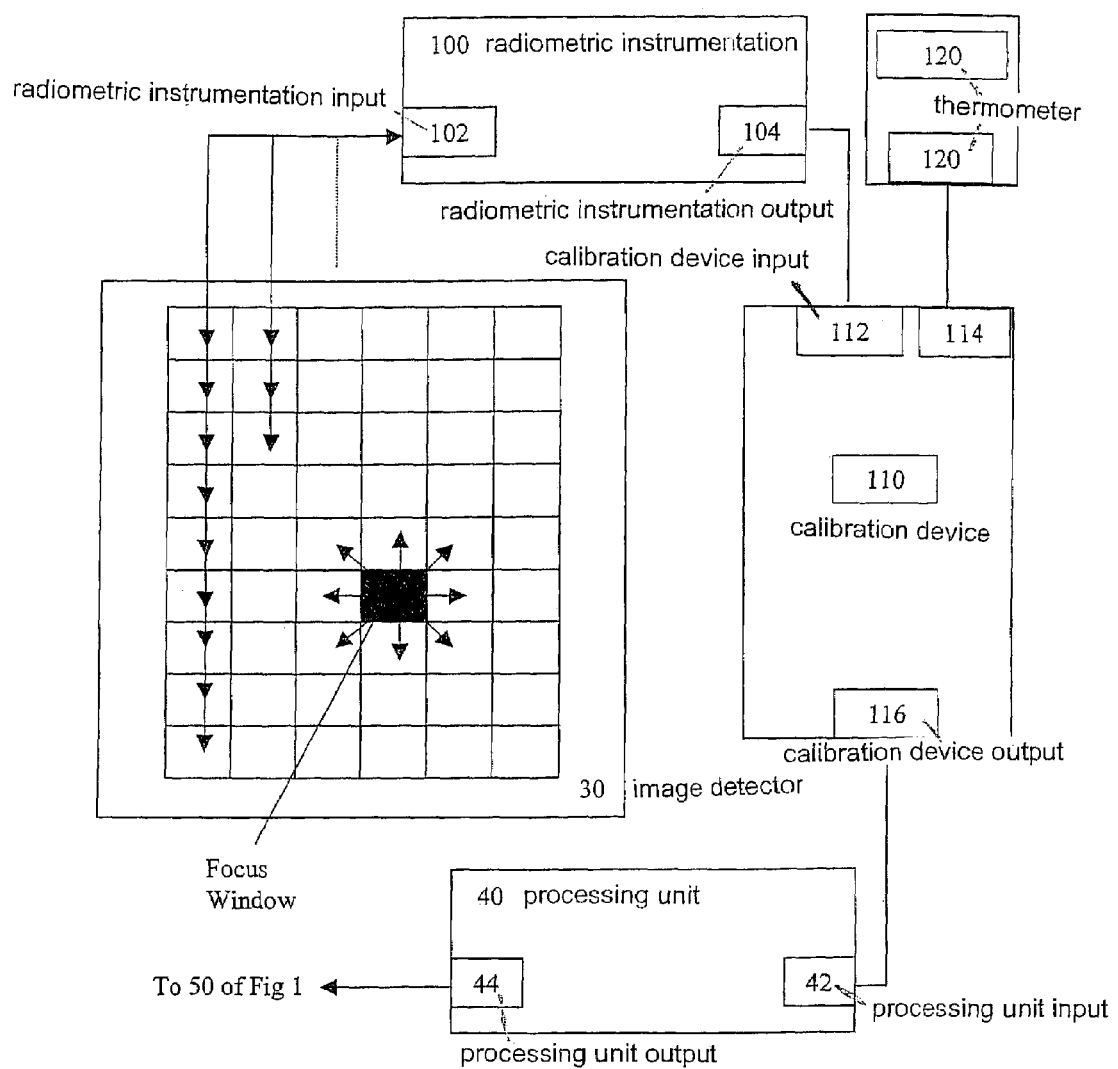
FIG. 3 depicts a second embodiment with the system of FIG. 2 supplemented with radiometric instrumentation for thermal calibration.

In a second embodiment with reference to FIG. 3, the apparatus focuses on a certain predetermined temperature value, for instance 37° C. or on temperature values in a closely related temperature interval or alternatively it focuses on another temperature value which is the nearest to a fix and predetermined temperature value. An absolute determination of a temperature value according to this embodiment requires radiometric calibration of the instrumentation. This is accomplished by means of a radiometric calibration device 110, possibly in combination with a temperature determining device such as a thermometer 120. An output 104 of the radiometric instrumentation 100 is connected to an input 112 of the radiometric calibration device 110. Another input 114 of this device 110 is connected to a thermometer input 122. Data from the radiometric calibration device 110 is sent from an output 116 to the input 42 of the processing unit 40, which derives a particular pixel, or a particular sub-array of pixels, in the image and then operates in a similar way as in the first embodiment.

Operation according to the second embodiment would be a convenient and efficient method for use when detection of humans is desirable, for example during rescue actions or for various surveillance purposes. Especially in combination with some kind of scanning equipment, large areas could efficiently be searched and surveyed from above by a minimum of personnel.

In an alternative second embodiment, also with reference to FIG. 3, the focus window is chosen based on predetermined threshold temperature values. These temperature values can be manually or automatically inserted parameters of the processing unit 40. One operative example of an application of this alternative embodiment could be related to thermal industrial processes. This often results in an image sub-area of pixels. The processing unit 40 then makes an iteration in order to derive the position of the moving means 50 giving the best adaptation to the focus function within the sub-area.

In some of these thermal industrial processes, it may be of crucial importance that certain temperatures are not exceeded and in other thermal processes, the temperature must not pass a lowest value. Nevertheless, when these limitations are exceeded anyway, a focus window preferably may be chosen at the position of the viewed image where this undesired temperature may occur. Then, a clear and focused image may be produced and thereafter be checked by controlling staff, who take the necessary actions.

Another alternative second embodiment allows that the processing unit 40, besides its focusing function, also can make a comparison of certain initial process images with current process images to monitor whether temperature differences exceed predetermined values or not. If such differences are exceeded, an alarm signal may be sent off to controlling staff, who can take the necessary actions to manage the arising situation.

Figure 4A:
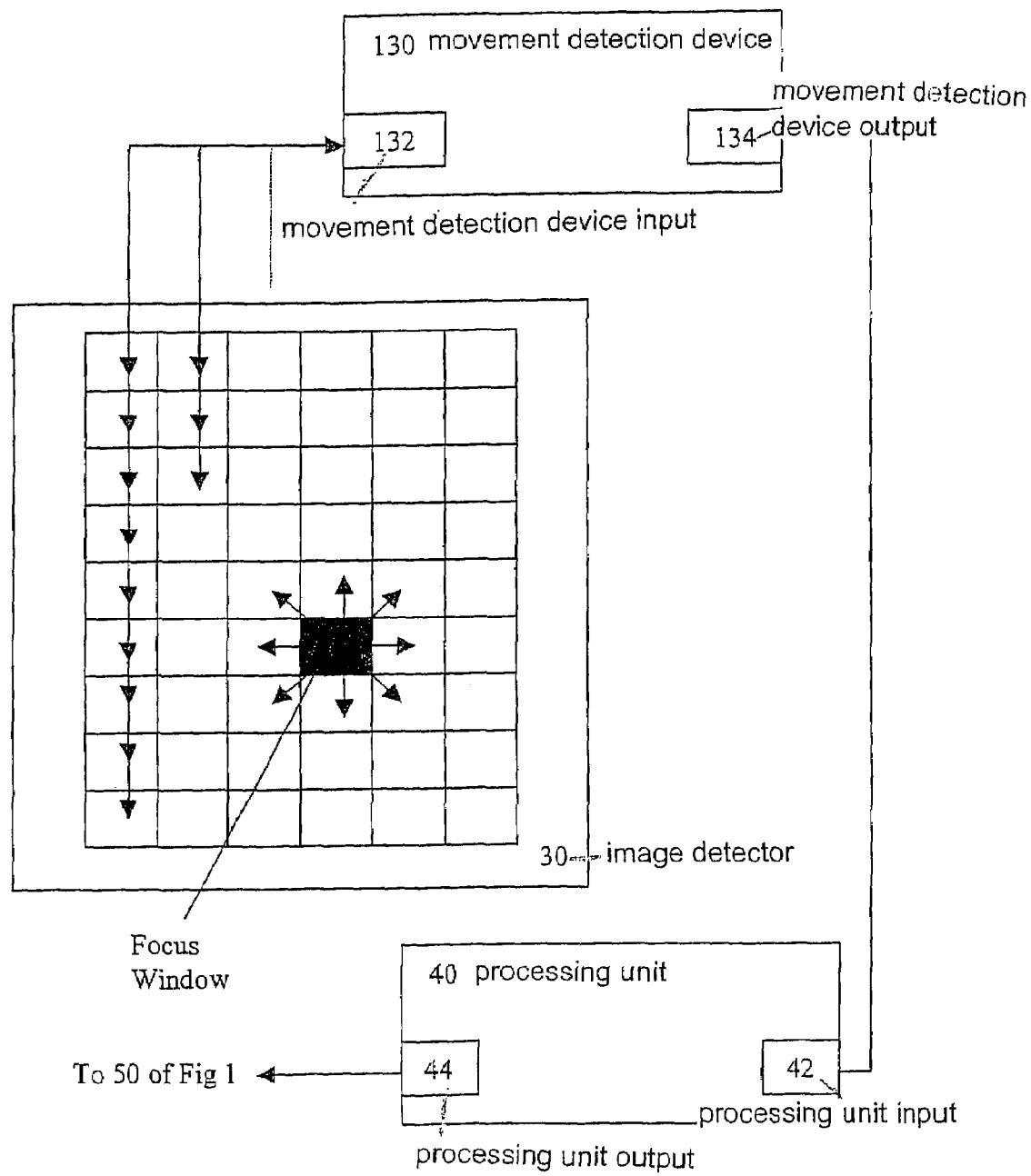
FIG. 4a illustrates a third embodiment, which uses a movement detection device for choosing a suitable focus window.

A third embodiment according to the invention shown in FIG. 4a could be an operative mode for real time recognition of moving objects within the viewed image and a corresponding focusing procedure on the at least one detector element, preferably adjacent pixels of the detector array 30 where movement is detected. The third embodiment therefore requires addition of a movement detection device 130 with an input 132 and an output 134 coupled to the detector means 30 and the processing unit 40 respectively. The processing unit 40 derives a particular pixel on the moving part of the picture on the image and follows this pixel from image to image and makes an iteration towards the best focus, by comparing the values of at least one pixel in the neighbourhood of the chosen moving pixel and the value of the chosen pixel, until the best adaptation to the focus function has been obtained. This embodiment could be a convenient and efficient approach to an apparatus for use in numerous surveillance applications but also for many other purposes, which are more or less closely related to such surveillance applications.

Figure 4B:
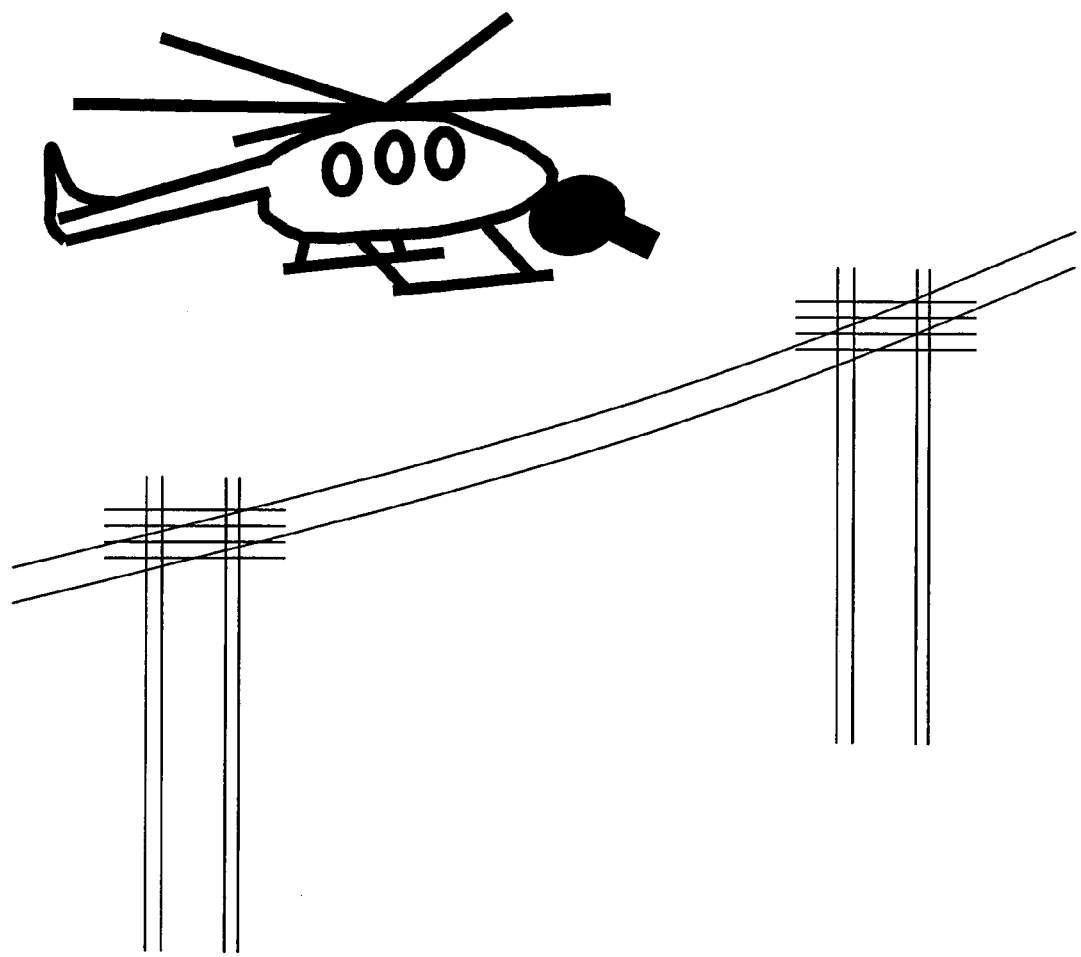
FIG. 4b schematically illustrates an embodiment for inspection of electric cables using a mobile image analysing focusing device according to the invention.
Figure 4C:
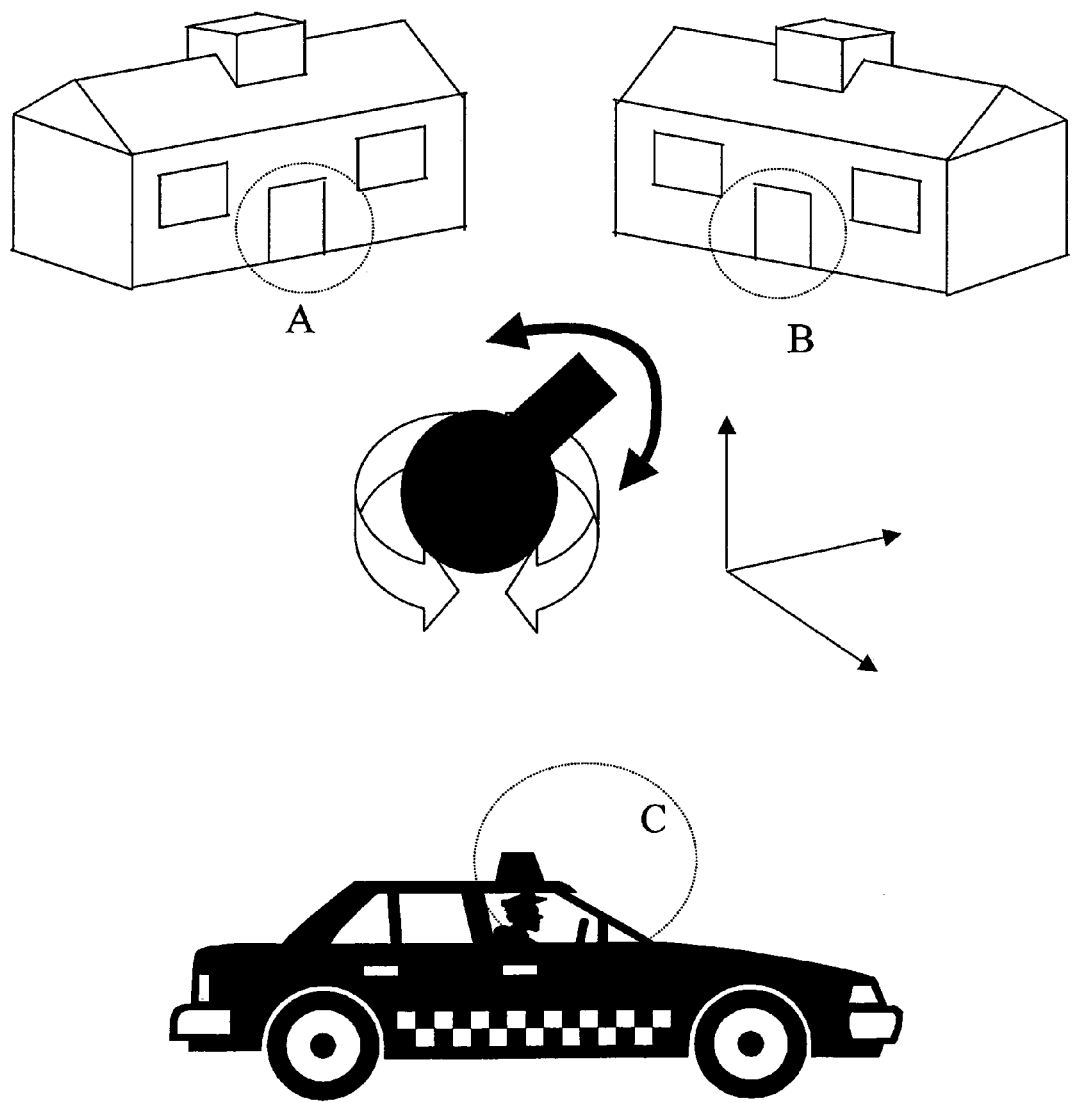
FIG. 4c schematically shows operation of a pan-tilt equipment using a focusing device according to the invention.

Other embodiments are illustrated in FIGS. 4b and 4c, whereby FIG. 4b depicts a system for inspection of electric cables, which system is movably installed in a helicopter. It shall be noted, that the movement of the camera may be controlled relative to the position of the vehicle for enhanced operation and focusing performance. FIG. 4c shows a so-called pan-tilt equipment, preferably in combination with a semi-automatic or fully automatic zooming device, which pan-tilt equipment will be further described in the following.

Focus Function

Referring to FIG. 1, when the image signals with or without radiometric data are delivered from the output 32 of the detector array 30 to the processing unit 40, the processing and analysis is initialised in the compiling unit 140 by arranging and compiling the image signals by means of a focus function. Such a focus function may be chosen in a plurality of ways due to numerous criteria, of which a number of alternative choices are described below. In the closest prior art document, to which document is referred above in the background section of the invention, is described a number of properties of a useful focus function. The shape of the focus function is determined by the focus criterion, some of which are according to the referred document:

unimodality, unambiguous interpretation of one maximum value of the focus function, although other local extreme values may be present;

accuracy, clear and unmistakable peak shape of the extreme value;

reproducibility;

range, even an optical system far away from focus must provide focus information;

implementation, fast iterative calculation to enable focusing as quickly as possible with minimal processing capacity;

generality concerning various types of images as well as compatibility with existing electronic equipment.

Except for these referred criteria of the focus function, others could be independence of other parameters and as well as of outer conditions other than the objective distance.

The following focus function could be used by the here invented focusing device and focusing method:

$$FMF(z) = \frac{1}{N} \sum (K \otimes I_z - m)^2 \qquad (1)$$

where the focus measure function FMF(z) is the in z-direction dependent focus function and K denotes a variable operator, which is further described below, m is another variable and N a factor of normalisation. Each of these three functions (K, m, N) can be varied in order to find the optimum focus function.

Figure 5:
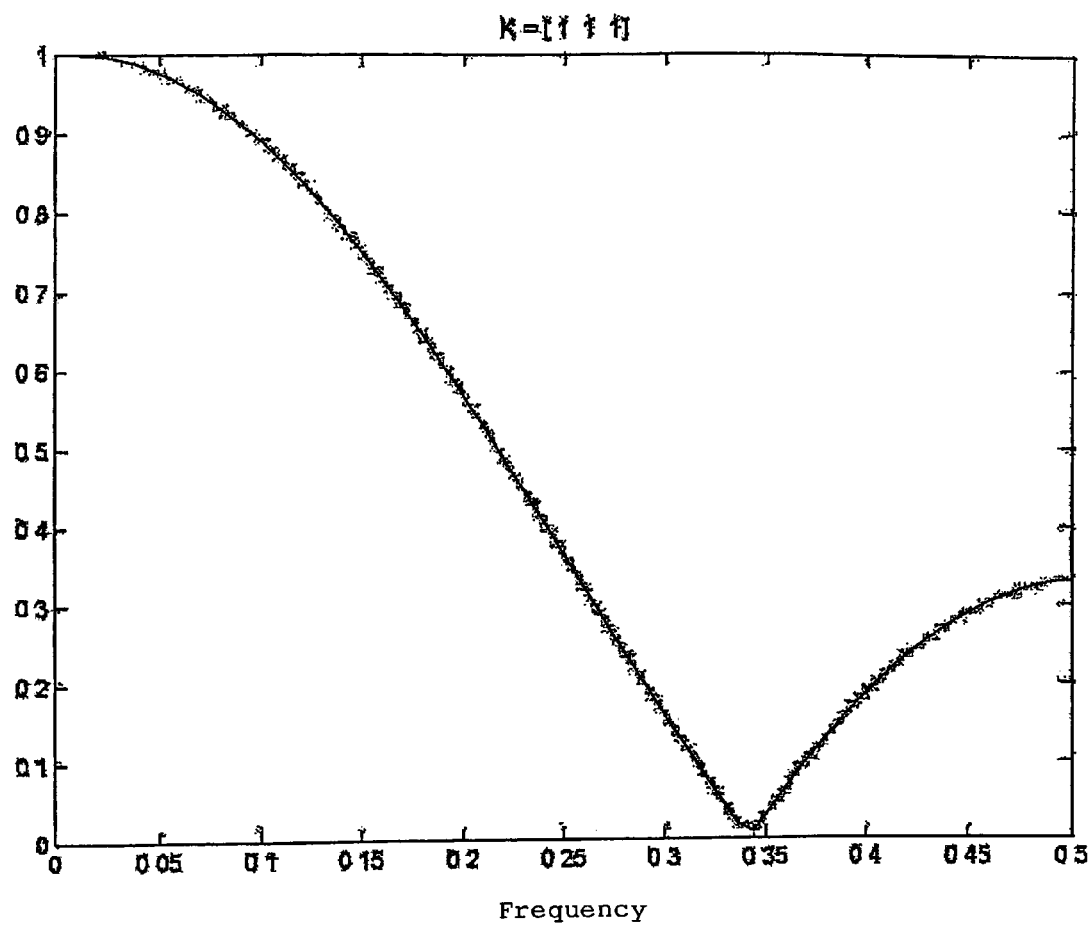
FIG. 5 shows a diagram of a low pass filtering with the normalised filtering versus the spatial frequency.

By utilisation of for instance the above disclosed equation (1), where the operator K is represented by K=[1 1 1], see FIG. 5. A convolution with K yields a low pass filtering of the image signal adapted for the coarse focusing. Hereby, high spatial frequencies are suppressed, which sometimes is designated filtered out, as the low spatial frequencies pass unchanged without any noticeable suppression. This is a more rough image analysis than the high pass filtering technique described below. This low pass filtering technique is used mainly for the initial and coarse adjustment of the optics when focusing.

Figure 6:
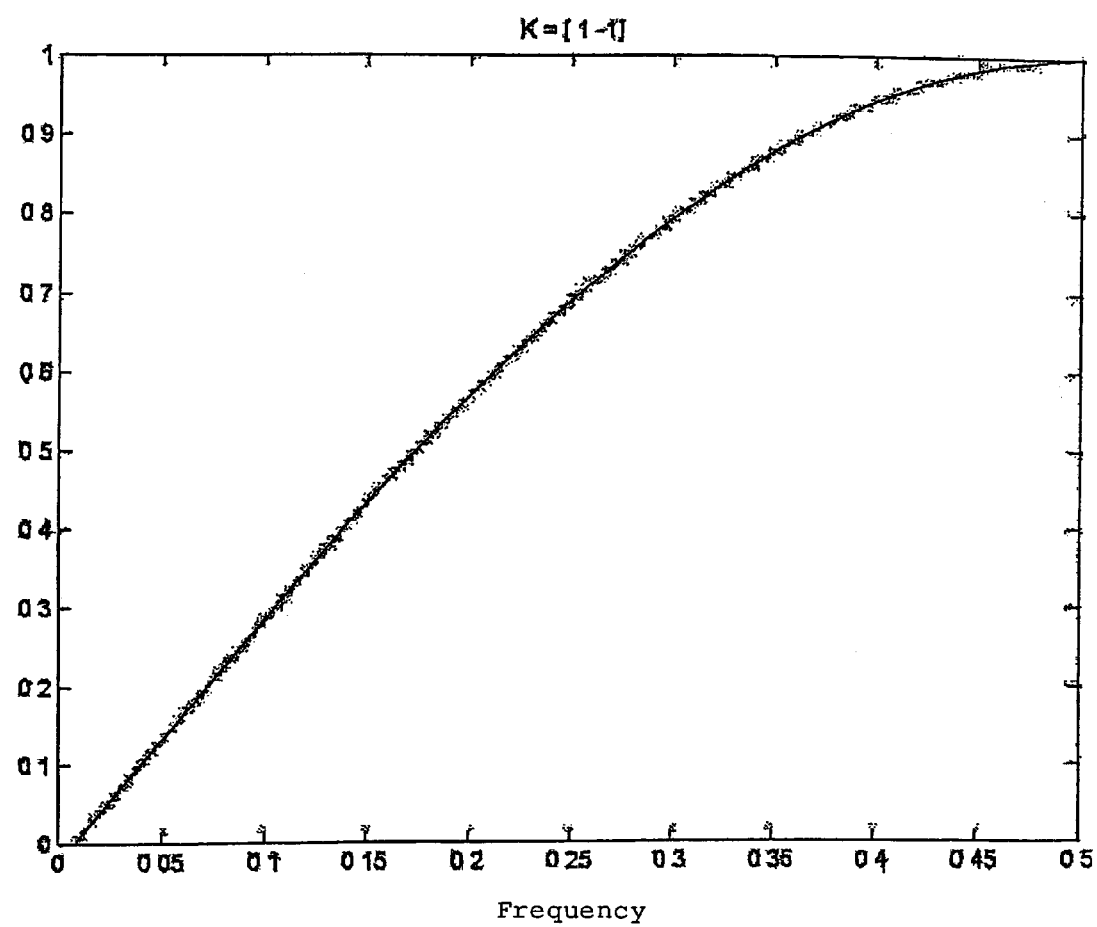
FIG. 6 depicts a high pass filtering using the same designation of the axes as in FIG. 5.

Provided utilisation of the same disclosed equation (1), with the operator K where K is represented by K=[1 −1], see FIG. 6, a convolution corresponds with a high pass filtering of the image. As a result of this process, we end up in the reverse relation between higher and lower frequencies in comparison with the low pass filtering procedure in the above described part.

Figure 7:
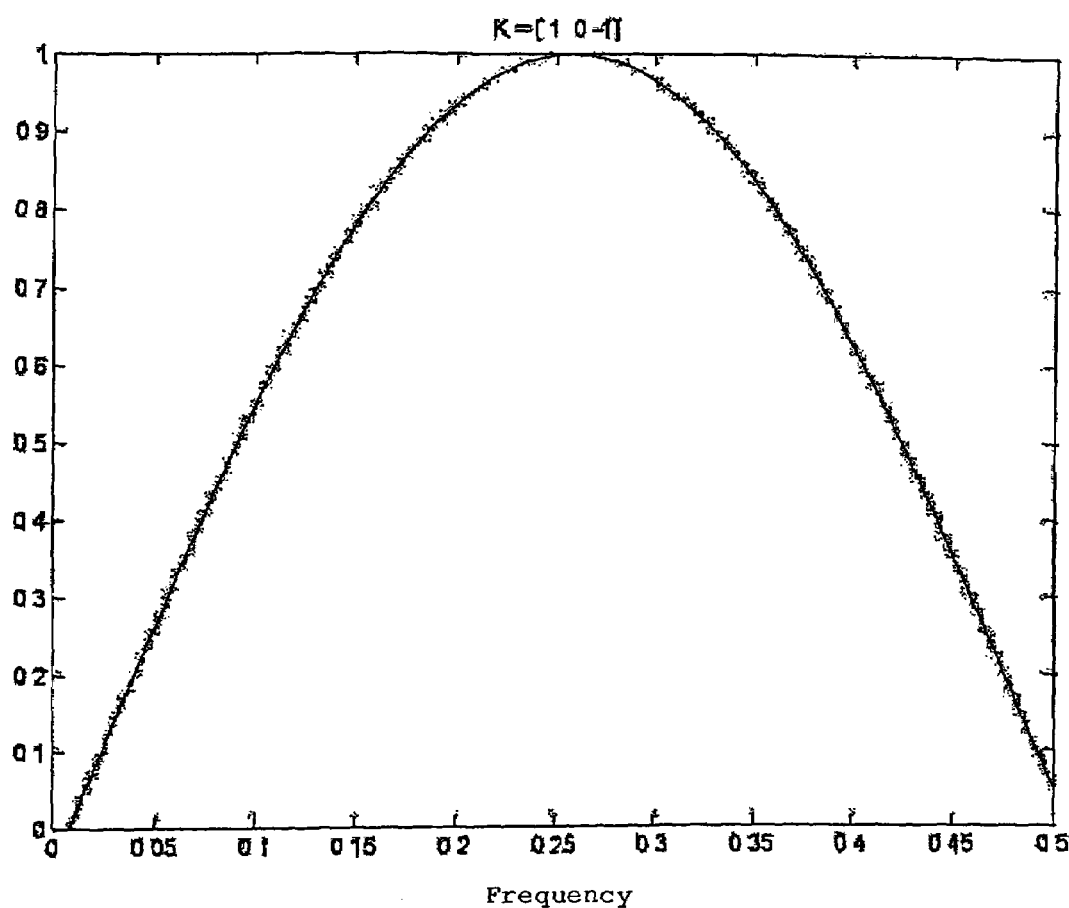
FIG. 7 illustrates band pass filtering according to the above FIG. 5 and FIG. 6.
Figure 8:
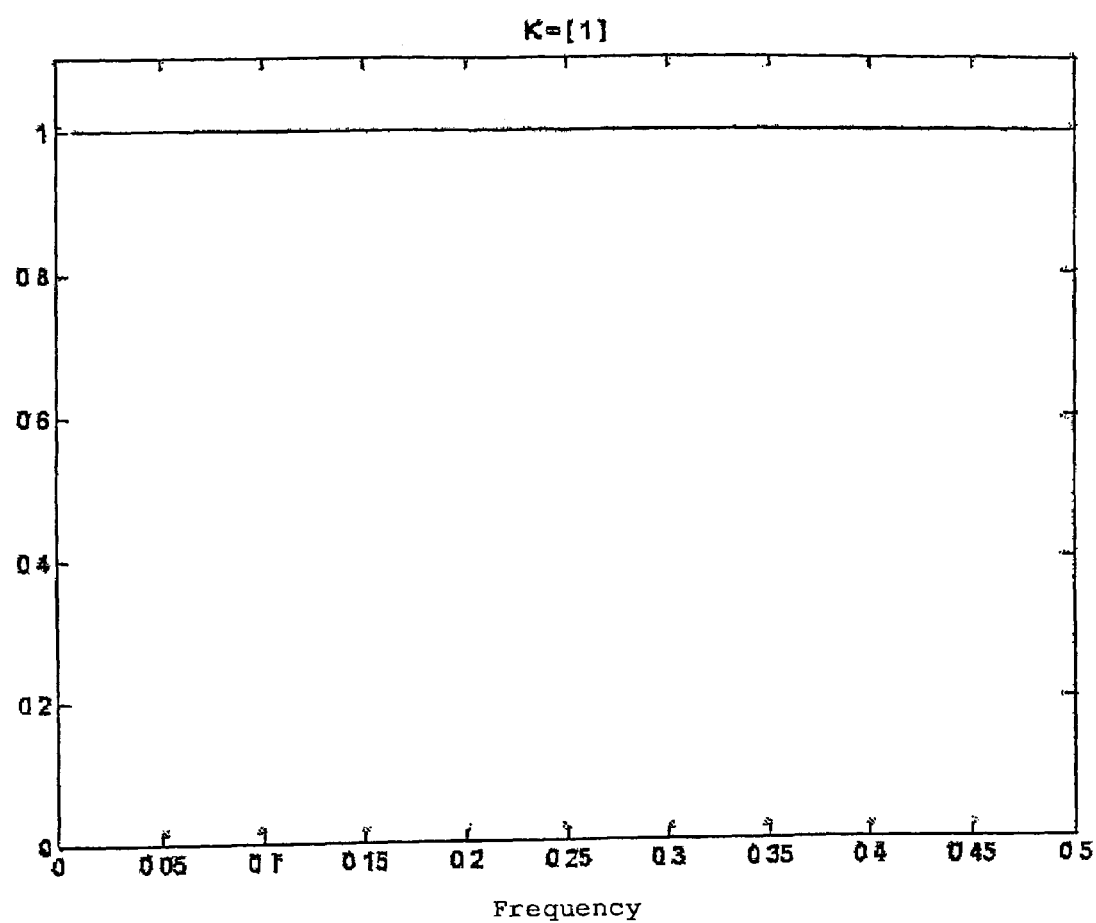
FIG. 8 shows a technique for constant filtering according to the above mentioned three FIGS. 5 to 7.

A third way of filtering is a band pass category of filtering, which is obtained when using the operator K=[1 0 −1], see FIG. 7. In this case, high and low signal frequencies are suppressed, while middle range frequencies are not. Simply, a frequency band is allowed to pass the filter. Yet another way is to use the operator K=[1], see FIG. 8, whereby the image remains unchanged since all frequencies may pass unchanged, which filtering technique in the following will be called all-pass filtering.

When a plurality of operators of said focus function are used at different stages in the focusing procedure, it is possible to tailor the filtering process in a way that speeds up the focusing procedure substantially and suits the current infrared optical system optimally. The focusing procedure is made faster because of the above disclosed and convenient method of simultaneously analysing both the low pass filtering results and the high pass filtering results, whereby the coarse focusing of the low pass filtering may precede the subsequent fine adjustments of the optics, whereby the fine adjustments benefit by utilisation of the results of the low pass filtering when the high pass filtering and fine adjustments are carried out.

An additional an considerable difficulty regarding infrared optical systems is the reduced depth of focus (f-number) in comparison with for instance visible light and (UV/VIS) optical systems, which forces the objective to comprise a much higher resolution in positioning in order to obtain acceptable sharpness. Consequently, an automatic focus for an infrared optical system requires a more complex and comprehensive focusing procedure where a simplification and improvement of the procedure is a prerequisite for development of an operating infrared optical system with an apparatus and method of an automatic focus.

The energy content of photons in the infrared frequency range is lower than of photons in the visible frequency range. For this reason, infrared detectors and especially uncooled infrared detectors are insensitive in comparison with visible light detectors. To compensate for this, most infrared systems are designed with a small f-number, which means with a large aperture and large angles down to the detector allowing passage of marginal rays and hence an enhanced collection of light energy. This yields a small depth of focus in the system and a fast optical suppression of higher spatial frequencies. In other words, a so-called magnitude transfer function, MTF, falls faster for higher frequencies than for lower frequencies when the optical system is defocused.

By using the focus measure function, FMF based on high spatial frequency content of the image, the FMF yields a sharp peak in focus, but very little information when the iterative procedure is distant from focus. Inversely, by using the FMF based on low spatial frequencies of the image, it gets broader with an analysable derivative also distant from focus. Its peak is substantially blunt with a very small or even negligible derivative in focus.

Figure 9:
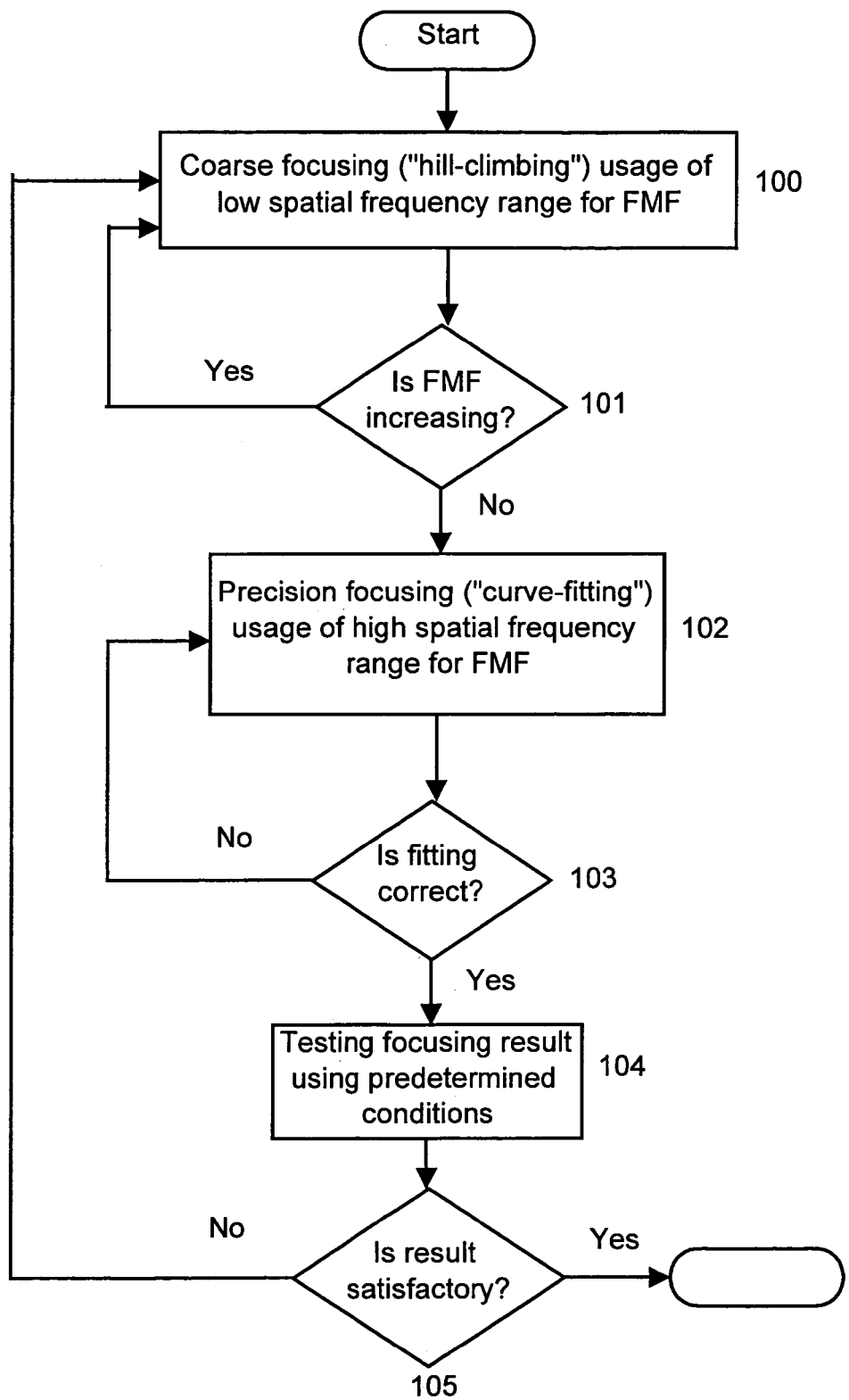
FIG. 9 illustrates in a block diagram the procedure of focusing using both the lower spatial frequencies and the higher spatial frequencies.

With reference to FIG. 9, a utilisation of FMF based on both the lower and higher spatial frequencies, or a combination of these, makes it is possible to take advantage of information originating in both frequency ranges, and hence to reach optimal performance and an operative search operation. The flow chart visualises the operation beginning with the coarse focusing technique using "hill-climbing" (step 100). This continues as long as the FMF is increasing (step 101). Then the precision focusing technique takes over (102) until correct fitting is achieved (step 103) followed by a test of the focusing result (step 104). Predetermined conditions regarding this check may be whether focusing is within allowed focusing range, object subjected to focusing correlates with pre-defined object to focus on etc. This focus procedure continues until the focusing result is satisfactory (step 105).

Search Operation for Focus

The analysis of the image continues in the analysing unit 150 of the processing unit 40. The focus measure function is generated and is objected to analysis. In order to determine how this analysis is to be done and what steps it should comprise, a determination of the optimum position of focusing optical convergence arrangement 20 is required. However, finding this optimum position is not the only demand upon the search operation. Requirements of the search operation for automatic focusing in optical systems in general are numerous and especially in infrared optical systems, since these systems involve additional requirements, for instance temperature dependent indices of refraction. The search operation has to be accurate and fast, reliable and has to require a minimum of processing capacity. Clearly, a search operation must of course be a balance of requirements against each other. A few crucial properties of the search operation will be mentioned, which are of great importance for the usefulness in an automatic focusing:

few measuring points, which is equal to few images needed for focusing;

only few crossings of the extreme value, i.e. focus position;

recognition of changes in position of the focused object is desirable.

The search operation described in this work includes a number of steps in connection with the focusing, whereby the focusing optical convergence arrangement 20 moves in correspondence with the image analysis, which focusing steps comprise:

fitting of the focus function to another function in good agreement with the focus function, preferably by a second degree polynomial or a Gauss polynomial;

iterative search for the focus point, i.e. an extreme value with a first derivative of zero value, suitably by means of a so called hill climbing technique;

tranquil operative commands distributed to the moving means 50 from the analysing unit 150 of the processing unit 40 when a focusing or a nearby focus position is reached in order to minimise disturbances.

An important feature of the search operation is that it is able to combine all three of the above mentioned functions. It chooses the function, which for the moment and for the current provided circumstances is the most rewarding and the search operation has the option to combine all functions freely. Depending on processing capacity of the optical system, the search operation may run and use several of the functions in parallel.

In infrared optical systems silicon or/and germanium often are the materials chosen for lenses, due to their transparencies to infrared wavelengths. Refractive indices of these materials give rise to substantial temperature dependent drifts, which drifts influence the focusing accuracy and the infrared optical system in general considerably. These drifts can be such extensive that only a fraction of all theoretically possible lens positions are relevant to analysis at a given temperature value. In other words, focus is undoubtedly achieved in a certain range of the whole range of all possible positions of the focusing optical convergence arrangement 20 when the arrangement 20 has a certain temperature. The analysis of the focus function and the search for the focus position may be done only within this range without any risk of finding focus outside of this range. In an optimum situation with a steady low or a steady high temperature, a large fraction of the complete set of images to be analysed may be omitted, whereby the analysis can be further speeded up and through this the focusing procedure of the infrared optical system.

The above described procedure of focusing guarantees an accurate and correct focusing as it uses both the advantages of the low spatial frequency range and those of the high spatial frequency range. The information contained in the low range prevents the focusing to be made in a false position as it enables the system to extract information about its position even distant from the point of focus. Information extracted from the high frequency range enables fast and accurate search for the point of focus when the system has reached a position nearby the pint of focus.

Figure 10:
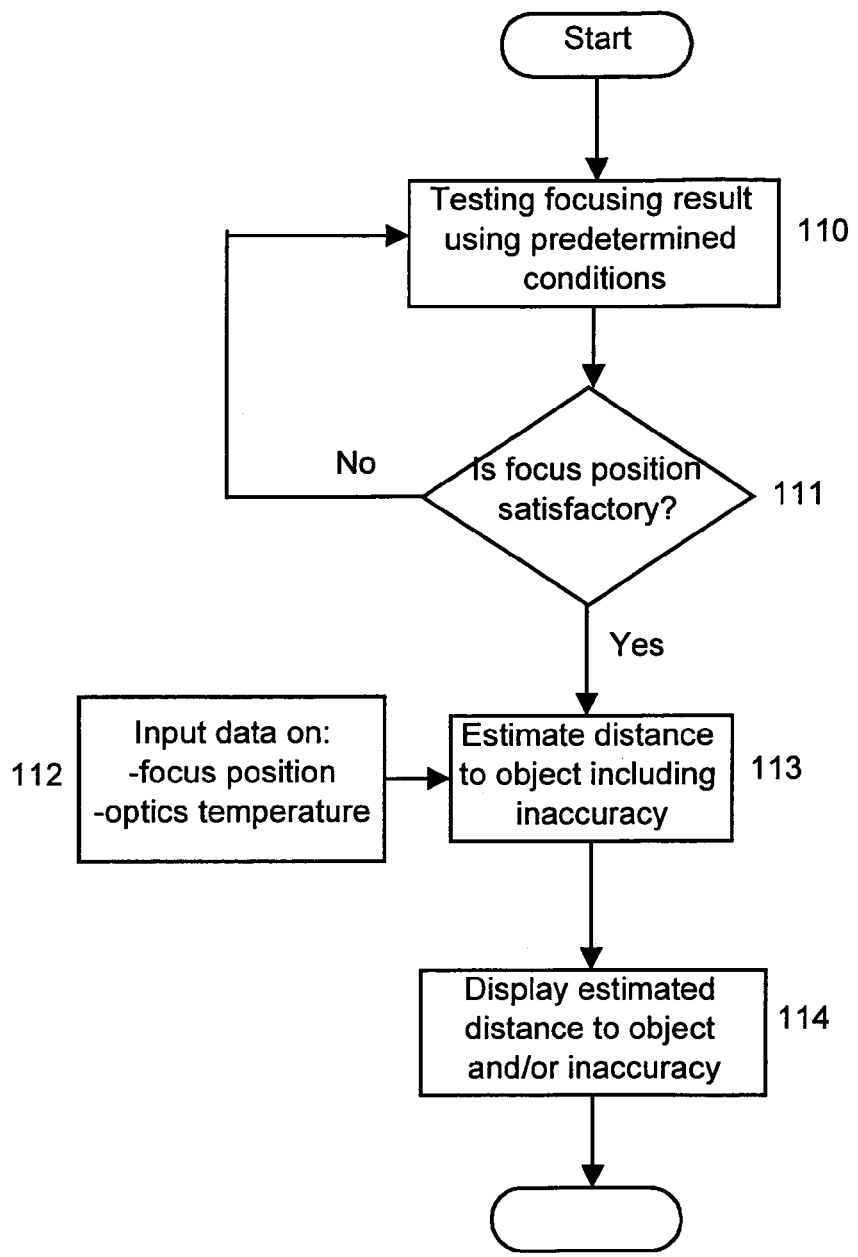

A system of the above described kind may also be used for estimation of a distance to the object, on which focusing is performed, provided a number of degrees of freedom are known to the system, i.e. the position of the moving part or parts at focus and the temperature of the optics during the focusing procedure. With reference to FIG. 10, a search operation is written into the compiling unit 140 (see FIG. 1) for performing the above mentioned estimation and presentation of estimated result. It begins with a test of the focusing result (step 110) preferably using the same predetermined conditions as in FIG. 9. Assuming the focusing result is satisfactory (step 111), information on position of the moving part or parts at focus and temperature data is delivered (step 112) allowing for an estimation of distance to viewed object as well as an estimation of the inaccuracy in this figure (step 113). This estimation could for example be in the form of a look up table written into the compiling unit 140 or the like. Subsequent to this estimation, the result may be displayed in any form (step 114) to the user of the image analysing optical apparatus.

Determination of the relation between parameters such as distance from the apparatus 10 to a viewed object, temperature of the optical components including lenses and focus position of the optics enables a semi-automatic or fully automatic calibration. If an automatic focusing procedure supports this calibration, it is also possible to determine the temperature and/or position of the focusing optics. This information can be displayed to the user in a way similar to the estimation of the distance to a viewed object as described above. Also the temperature of the object, which is viewed and focused on is possible to determine, based on utilisation of the information provided by the radiometric calibration device 110.

Figure 11:
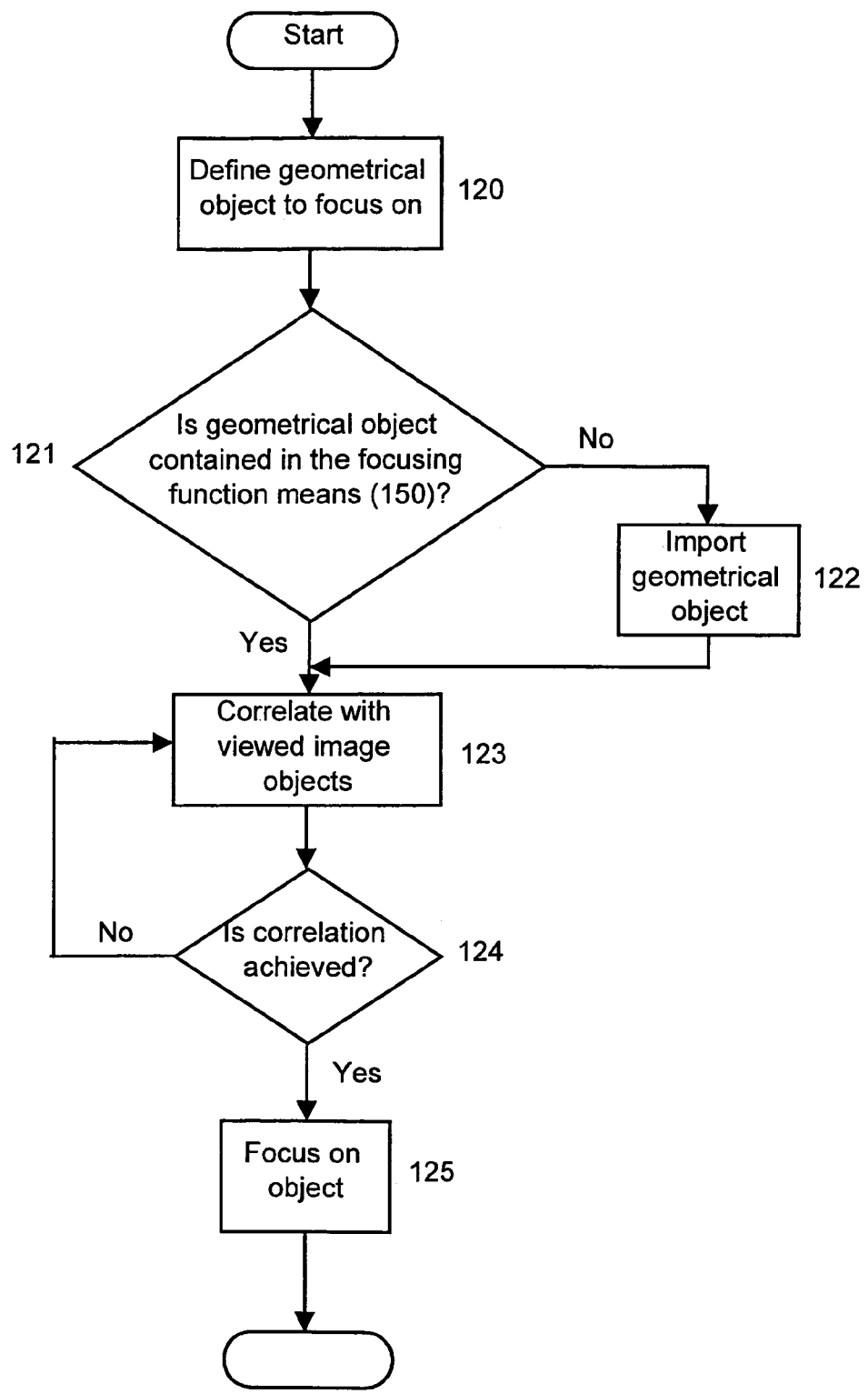
FIG. 11 illustrates in a block diagram the procedure of correlating viewed objects with pre-defined objects.

According to another embodiment shown in the flow chart of FIG. 11, geometrical objects within the image may be pre-defined and focused on. First in the sequence is a definition of a geometrical object to focus on (step 120) and then a check whether this object already is contained within the focusing function means 150 (step 121) or the object is imported (step 122), preferably from the memory location 160 of the processing unit 40. Then the sequence begins to correlate the pre-defined object with object within the image (step 123) until correlation is achieved (step 124). With correlation, the system may be instructed to focus on the correlating object of the image (125).

Figure 12:
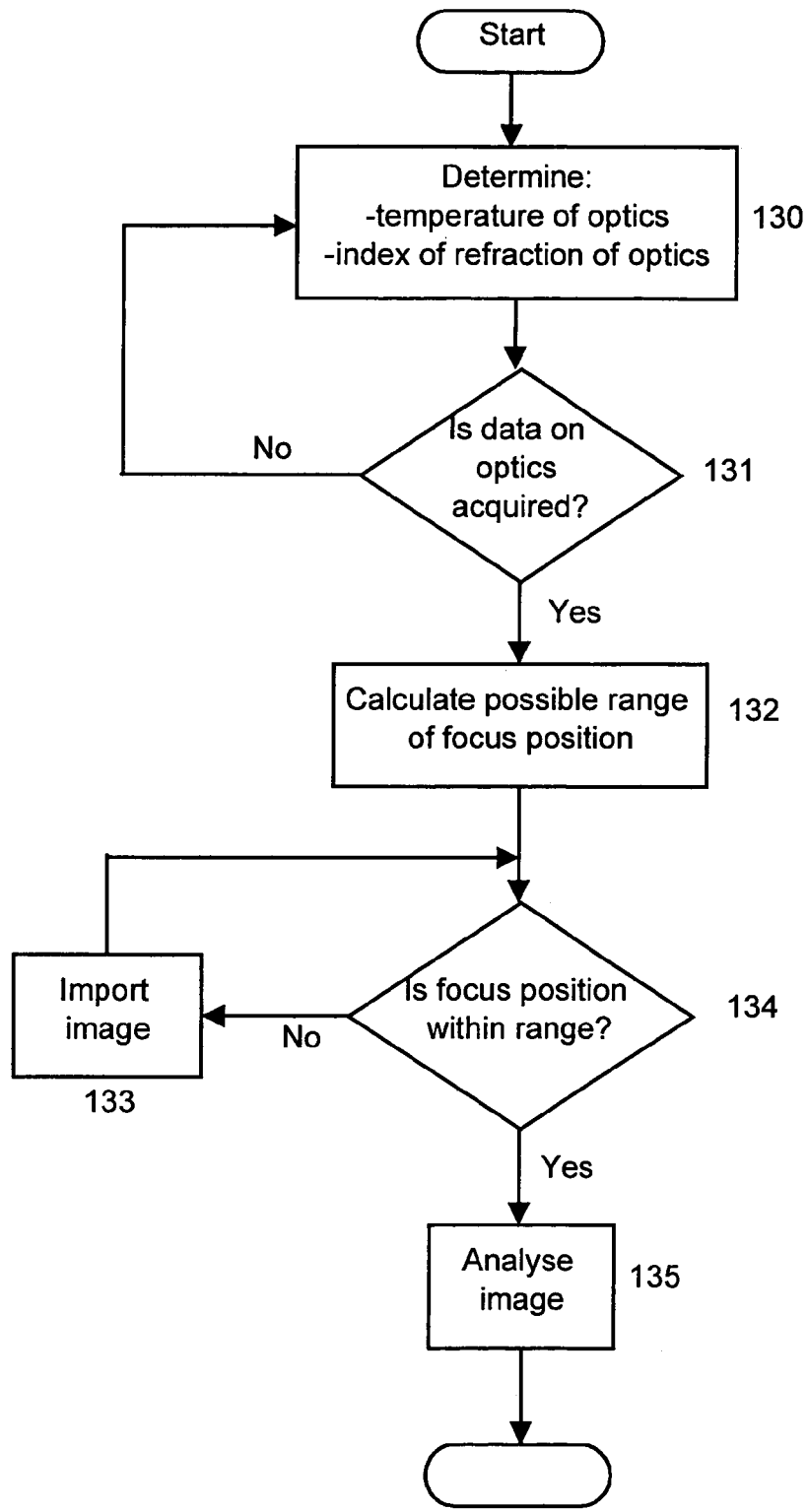
FIG. 12 shows a block diagram of the calculation of a possible lens position range in which the focus position must be contained.

Yet another embodiment of the functionality of the search operation means with reference to FIG. 12 enables a faster and more processing capacity saving operation of the image analysing automatic focusing device. The embodiment enables a reduced number of images to analyse in dependence on the temperature at which a focusing is done. Initially (step 130) is determined the temperature of the moving part or parts of the optics as well as the indices of refraction in the optical system. When this data is acquired (step 131) a possible range containing the focus position is calculated by the processing unit 40 (step 132). As long as an image is within this focus range (step 134) it is analysed (step 135) and if the image originates outside the current range, a new image is imported (step 133) for analysis, without analysing the previous image.

A system of the above described kind may also be combined with so-called pan-tilt equipment. A pin-tilt equipment has a number of pre-defined areas of the image detecting means 30, and it changes its position between these pre-defined areas, preferably with a polling communication between a control unit. Regarding this application, the control unit may be the processing unit 40. During the scanning of said pre-defined areas, trigger functions of any kind, for instance moving objects, a relative or an absolute temperature value or change, may cause the control unit to send an alarm signal to an operative unit, such as maintenance staff or action can be taken automatically.

Feasible Applications

An image analysing focusing device according to the invention may be utilised in numerous applications. In this section will be described a number of feasible and suitable technical fields and areas for the automatically focusing device. One area of use is various inspection purposes, especially inspection of electrically operating devices and inspection of damages related to an increased temperature in a conduit or a conductor. An increased temperature of the described kind arises as a consequence of enlarged electrical resistance, due to a narrowing in a damaged wire or cable. Another related field is power plant inspection. The inspection can be done from a variety of hand-held or mobile units mounted in vehicles, helicopters, etc (see for example FIG. 4b).

A list of inspection applications in connection with the invention according to this application follows: petrochemical, furnace, medical, for instance when examining tumours, thrombosis, physical CNS injuries and mammary cancer.

Another suitable field of use is various surveillance applications. Some of them are process monitoring, automation in general and for use research and developing activities, especially in the electronics industry and components manufacturing. Others are human or maritime surveillance, aircraft airport surveillance, customs and security surveillance of for example border-lines. Military and paramilitary is yet another conceivable field of use.

A large number of technical fields will come in consideration when the invention according to this application allows for fewer lenses and less complicated mechanical machinery which in infrared devices is rather expensive, in favour of a further developed and by means of processing capacity modernised equipment with a considerably reduced total cost for the customers.

The invention claimed is:

1. An image analysing focusing device for an infrared optical apparatus (10) comprising:
   a controllable optical convergence element (20);
   an image detector (30) arranged so as to receive an image of an object projected by the optical convergence element; and
   a processor arranged so as to receive signals from the image detector and to generate control signals to control the optical convergence element (20) to focus the image of the object onto the image detector (30);
   wherein the processor comprises a search element constructed and arranged so as to analyze the image on the image detector (30) to select at least one image window in the image in connection with which a focusing operation is to be performed in accordance with predetermined conditions; and
   wherein the processor further comprises a focusing element (150) in the processing means (40) constructed and arranged so as to control the optical convergence element so as to focus a portion of the image within the at least one image window using an iterative process;
   wherein the iterative process comprises the steps of:
   performing a coarse focusing using only a first range of spatial frequency components of the image; and
   after the coarse focusing step, performing a fine focusing using only a second range of spatial frequency components of the image, the second range being higher than the first range;
   wherein the predetermined conditions comprise estimation of a distance from the apparatus (10) to a viewed object based on information on temperature and/or position of the optical convergence means (20).

2. Device as claimed in claim 1, characterised in that the predetermined conditions comprise estimation of a distance from the apparatus (10) to a viewed object based on information on temperature and/or position of the optical convergence means (20) comprising at least one of the options:
   presenting estimated distance to the viewed object;
   presenting inaccuracy of the estimation;
   presenting a combination of the above estimated distance and inaccuracy;
   presenting data only when the search operation means (140) has obtained an acceptable focus position.

3. Device as claimed in claim 1, characterised in that an estimation of the temperature of a viewed object is done based on information on an estimation of distance from the apparatus (10) to a viewed object provided by the calibration device (110), optics temperature and/or position of the optical convergence means (20).

4. Device as claimed in claim 3, characterised in that an estimation of the temperature of a viewed object is done based on information on a distance from the apparatus (10) to a viewed object, optics temperature focus position of the optical convergence means (20) comprising at least one of the options:
   presenting estimated temperature of the viewed object;
   presenting inaccuracy of the estimation;
   presenting a combination of the above estimated temperature and inaccuracy;
   presenting data only when the search operation means (140) has obtained an acceptable focus position.

5. An image analysing focusing method for an infrared optical apparatus (10) comprising controllable optical convergence element (20), an image detector (30) arranged so as to receive an image of an object projected by the optical convergence element (20), a processor arranged so as to receive signals from the image detector and to generate control signals to control the optical convergence element (20) to focus the image of the object onto the image detector (30), the focusing method comprising the steps of:
   analyzing the image on the image detector (30) to find at least one image window in the image for which a focusing is to be done in accordance with predetermined conditions; and
   providing a focusing on the at least one image window based on providing as distinct differences between individual detecting positions (pixels) within the image window as possible using an iterative process comprising the steps of:
   performing a coarse focusing using only a first range of spatial frequency components of the image; and
   after the coarse focusing step, performing a fine focusing using only a second range of spatial frequency components of the image, the second range being higher than the first range;
   wherein the predetermined conditions of the focusing comprise use of a focus function of the form $$FMF(z) = \frac{1}{N}\sum (K \otimes I_z - m)^2,$$

where K is an operator, N a factor of normalisation and m is a variable.

6. Method as claimed in claim 5, characterised in that the operator values of the focus function comprise: K=[1 1 1], K=[1 -1], K=[1 0 -1] and K=[1].

7. Method as claimed in claim 6, characterised in that use of the operator values of the focus function is made with a variation depending on individual requirements of each system, by applying the operator functions in more than one direction in the image.

8. A focusing device for an infrared optical apparatus comprising:
   a controllable optical convergence element;
   an image detector arranged so as to receive an image of an object projected by the optical convergence element and to generate an image signal based on the received image; and
   a processor arranged so as to receive the image signal and to generate control signals to control the optical convergence element to focus the image of the object onto the image detector;
   wherein the processor is constructed and arranged to generate the control signals based on selected components of said image signal from the image detector that represent at least one image window in the image using an iterative process;
   wherein the iterative process comprises the steps of:
      performing a coarse focusing using only a first range of spatial frequency components of the image using a "hill-climbing" technique; and
      after the coarse focusing step, performing a fine focusing using only a second range of spatial frequency components of the image, the second range being higher than the first range, the fine focusing step using a "curve-fitting" technique comprising adapting a mathematical function and calculating a maximum value of said function;
   wherein the device is constructed and arranged to perform semi-automatic or fully automatic calibration of the relation between at least two of the following parameters:
      distance from the device to a viewed object;
      temperature of the optical convergence element; and
      focus position of the optical convergence element;
   wherein the device is constructed and arranged to estimate a distance from the device to the viewed object based on information on at least one of temperature and position of the optical convergence element.

9. The device of claim 8, wherein the device is constructed and arranged to estimate the distance from the device to the viewed object based on information on at least one of temperature and position of the optical convergence element, the device further providing at least one of the options:
   presenting estimated distance to the viewed object;
   presenting inaccuracy of the estimation;
   presenting a combination of the above estimated distance and inaccuracy;
   presenting data only when the device has obtained an acceptable focus position.

10. The device of claim 8, wherein the device produces an estimation of the temperature of the viewed object based on information on an estimation of distance from the device to the viewed object provided by at least one of the calibration device, optics temperature, and position of the optical convergence element.

11. The device of claim 10, wherein the device produces an estimation of the temperature of the viewed object based on information on an estimation of distance from the device to the viewed object provided by at least one of the calibration device, optics temperature, and position of the optical convergence element, the device further providing at least one of the options:
   presenting estimated temperature of the viewed object;
   presenting inaccuracy of the estimation;
   presenting a combination of the above estimated temperature and inaccuracy;
   presenting data only when the device has obtained an acceptable focus position.

* * * * *